United States Patent Office 3,817,900
Patented June 18, 1974

3,817,900
LUBRICANTS FOR THERMOPLASTIC RESINS SUCH AS POLYVINYL CHLORIDE
Masaru Higuchi, Hajime Ohnishi, and Hiroshi Yagihara, Saitama, Japan, assignors to Daicel Ltd., Osaka, Japan
No Drawing. Filed Dec. 27, 1971, Ser. No. 212,787
Claims priority, application Japan, Dec. 30, 1970, 46/122,245; Nov. 17, 1971, 46/92,284
Int. Cl. C08f 45/32, 45/34, 45/42
U.S. Cl. 260—30.4 R                    4 Claims

ABSTRACT OF THE DISCLOSURE

Novel lubricants for plastics, especially polyvinyl chloride resins, are provided, which comprise compounds represented by the following general formulae (1) and (2):

(1)

and

(2)

wherein R and R' each represent hydrogen or a straight chain, saturated alkyl radical, and the sum of the carbon atoms in both radicals R and R' being 14–42, A and B represent hydrogen

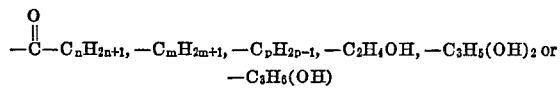

in which $n$, $m$ and $p$ represent an integer of 1–9, 1–10 and 2–10, respectively.

---

The present invention relates to a lubricant for molding and fabricating plastics comprising compounds represented by the general formulae:

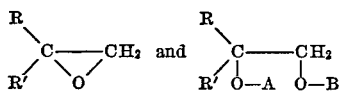

wherein R and R' each represent hydrogen or a straight chain, saturated alkyl radical, and the sum of the carbon atoms in both radicals R and R' is 14–42, and A and B represent hydrogen

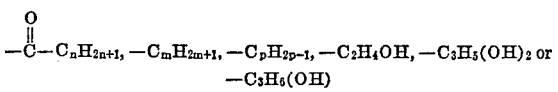

in which $n$, $m$ and $p$ represent an integer of 1–9, 1–10 and 2–10, respectively.

In general, lubricants for plastics increase the fluidity of the plastics and prevent the plastics from sticking or adhering to parts of molding machines. The lubricants, therefore, are important for improving the workability and processibility of the plastics and particularly they are used as an indispensable additive in the treatment of rigid polyvinyl chloride. As such lubricants for plastics, there have been used various materials such as paraffin waxes, higher fatty acids, higher alcohols and esters thereof. The properties required for lubricants are, in addition to flow promotion properties, that they do not cause decomposition or coloring in the course of the process and they do not cause plate-out or do not harm transparency. However, a lubricant which satisfies all of these requirements has not been known.

We have found that the compounds of the general formulae shown above:

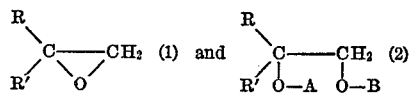

wherein R, R', A and B have the same meanings as above exhibit not only excellent flow promotion properties but also other effects desirable for lubricants when incorporated in plastics to be molded. Namely, they are stable at a high temperature and they do not cause decomposition, coloring or plate-out, thereby yielding quite transparent products. The present invention has been accomplished on the basis of these findings.

As the compounds of the above general formula

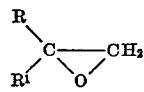

wherein one of R and R' represents hydrogen, there may be mentioned, for example, 1,2-epoxyhexadecane, 1,2-epoxyheptadecane, 1,2-epoxyoctadecane, 1,2-epoxynonadecane, 1,2-epoxyeicosane, 1,2-epoxyheneicosane, 1,2-epoxydecosane, 1,2-epoxytricosane, 1,2-epoxytetracosane, 1,2-epoxypentacosane, 1,2-epoxyhexacosane, 1,2-epoxyheptacosane, 1,2-epoxyoctacosane, 1,2-epoxynonacosane, 1,2-epoxytriacontane, 1,2-epoxyhentriacontane, 1,2-epoxydotriacontane, 1,2-epoxytritriacontane, 1,2-epoxytetratriacontane, 1,2-epoxypentatriacontane, 1,2-epoxyhexatriacontane, 1,2-epoxyheptatriacontane, 1,2-epoxyoctatriacontane, 1,2-epoxynonatriacontane, 1,2-epoxytetracontane, 1,2-epoxyhentetracontane, 1,2-epoxydotetracontane, 1,2-epoxytritetracontane and 1,2-epoxytetratetracontane. As the compounds of the above general formula wherein both R and R' represent an alkyl radical, there may be mentioned compounds (which may be used alone or in the form of a mixture of two or more compounds) containing a total of 14–42 carbon atoms in the two alkyl radicals R and R' such as ethyl, butyl, hexyl, octyl, decyl, dodecyl, tetradecyl, hexadecyl, octadecyl, eicosyl, docosyl, tetracosyl, hexacosyl, octacosyl, triacontyl, dotriacontyl, tetratriacontyl, hexatriacontyl, octatriacontyl, tetracontyl and dotetracontyl. The compounds of the above general formula containing 43 or more carbon atoms have sufficient possibility of being used as lubricants, though they have not been tested due to the difficulty of synthesis of them on an industrial scale. The compounds of the present invention can be synthesized by, for example, treating an α-olefin of 14–42 carbon atoms, which is obtained, for example, by cracking of a higher paraffin wax or oligomerization of ethylene in a conventional method, with hydrogen peroxide or an organic peracid. The compounds can be synthesized also through chlorohydrin. These methods for the synthesis of the compounds of the present invention are referred to in D. Swern et al., J. Am. Chem. Soc. 68, 1501 (1946); Chem. Rev. 45, 1 (1949); Org. Reaction, 7, 378 (1953); H. C. Wohlers et al., Ind. Eng. Chem., 50, 1685 (1958); Masuo and Kato, Org. Synth. Chem. (Japan), 26, 367 (1968); Takagi et al., Bulletin Ind. Chem. (Japan), 69, 1080, (1966), 70, 1446 (1967) and Oil Chem. (Japan), 16, 462, (1967).

As the compounds of the above general formula:

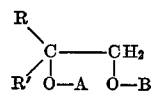

there may be mentioned, for example, monoalkylenediols and dialkylenediols of 16–44 carbon atoms which correspond to the hydrolysis products from the above

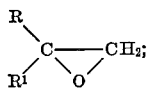

monoesters and diesters thereof with acetic acid, propionic acid, butyric acid, valeric acid, caproic acid, enanthic acid and capyrylic acid; methyl, ethyl, propyl, butyl, pentyl, hexyl, heptyl, octyl, nonyl and decyl mono- and diethers thereof; mono- and diethers thereof with monoolefinic hydrocarbons having 2 to 10 carbon atoms and hydroxyethyl, hydroxypropyl and dihydroxypropyl mono- and diethers thereof. These compounds may be obtained by a combination of reactions of the corresponding oxides with water, corresponding alcohols, acids, acid anhydrides and chlorides. Some of the reactions may be shown by the following diagram:

an amount of 0.1 to 0.5%. If an opaque product is obtained, an excessive amount is allowed.

The incorporation of the additive may be effected by a usual manner known in the art. These compounds used in the present invention are stable to heat, light and air at the time of and after the addition or during and after the processing. Poorer properties in mechanical characteristics of the plastics due to decomposition, coloring or deterioration are thus not observed. The lubricants according to the present invention may be used alone or in the form of a mixture of two or more compounds of the above general formulae. Particularly, transparency is improved as the carbon number of the compounds is widely distributed. The lubricants may be used together with known additives such as plasticizers, stabilizers, antioxidants, other lubricants, UV absorbing agents, flame retardants, colorants and antistatic agents.

Excellent properties of the lubricants of the present invention will be shown below by way of Preparations and

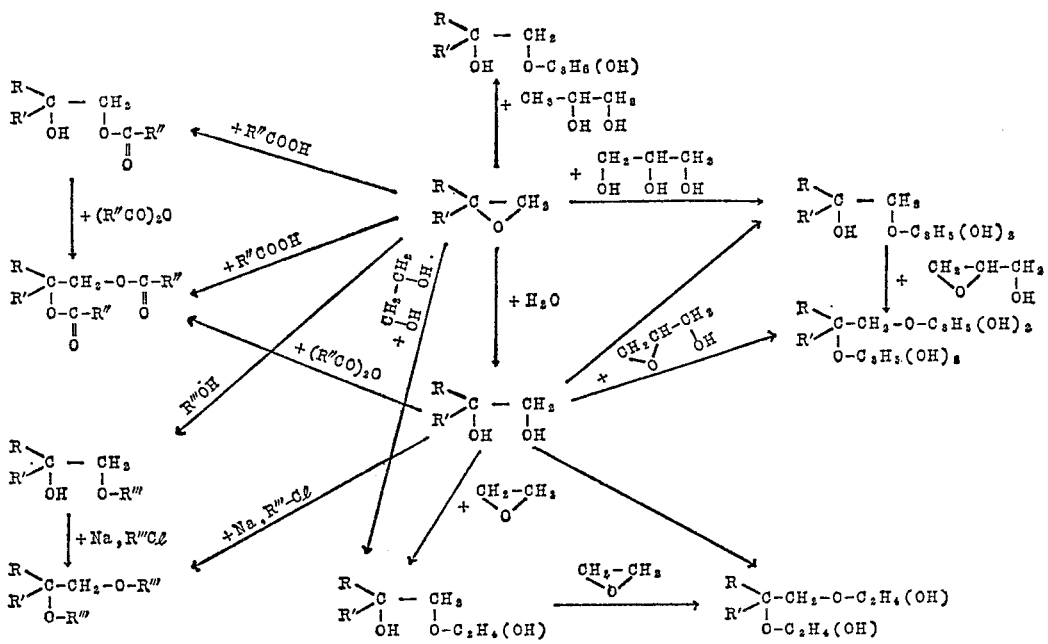

Though the detailed mechanism of the action of the lubricants on plastics is still unknown, at least a moderate compatibility with the plastics to be treated is required. If compatibility is too high, the lubricants act as internal plasticizer and, on the other hand, if compatibility is too low, they cause plate-out. Thus, too high and too low compatibilities are not desirable for the lubricants.

The compounds used in the present invention contain in a molecule a long chain alkyl radical as nonpolar component and epoxy, hydroxyl, ether or ester radical as polar component. The lubricants possess a suitable compatibility with plastics which results from a good balance between said nonpolar and polar components and, consequently they act as excellent lubricants in the process for molding and fabricating plastics. As plastics to be treated, there may be mentioned thermoplastic resins comprising homopolymers and copolymers of vinyl chloride, vinylidene chloride, ethylene, propylene, styrene, etc. The optimum amount of the lubricant to be used varies depending upon the kinds of plastics to be treated. However, a sufficient effect can be usually obtained by 0.01–3% by weight of the lubricant based on the plastic. Particularly, in case of vinyl chloride resins, it is desirable to incorporate the lubricant in an amount of 0.1–1.5%. With respect to lubricant compounds having total carbon atoms of 16 to 30 in R and R', it is preferable to use the same in an amount of 0.3 to 1.5%, while, with respect to lubricant compounds having total carbon atoms of 31 to 42 in R and R', it is preferable to use same in Examples which, however, by no means limit the invention. In the following Examples, parts are by weight, unless otherwise specified.

The Preparation show examples of the synthesis of the lubricant compounds of the present invention.

PREPARATION 1

133 parts of α-olefins of 20–30 carbon atoms (average molecular weight 334) were charged in a stainless steel reactor provided with a reflux condenser, stirrer, thermometer and dropping funnel and heated to 60° C. Then, 185 parts of peracetic acid solution [comprising 46.5% of ethyl acetate, 19.5% of peracetic acid, 0.5% of water, 0.03% of an organic phosphate of the formula $Na_5\text{-}(2\text{-ethylhexyl})_5\text{-}(P_3O_{10})_2$ 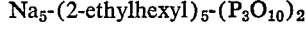

and the remainder of acetic acid] were added over one hour. Thereafter, the reaction was continued at an elevated temperature of 65° C. for 3 hours and then at 70° C. for one hour. After completion of the reaction, low boiling fractions were distilled out under reduced pressure and acetic acid was distilled out in a thin film evaporator to obtain 140.3 parts of the product, which will be referred to as lubricant [A] of the present invention hereinafter. Lubricant [A] is comprised principally of (1) 75% of compounds of the general formula:

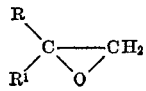

wherein either one of R and R' represents hydrogen and the other represents a straight chain, saturated alkyl radical of 18–28 carbon atoms and (2) 25% of compounds of the same formula wherein both R and R' represent a straight chain, saturated alkyl radical, total carbon atoms in both radicals being 18–28. IR analysis proved the existence of

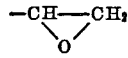

(3050, 1250, 915, 850 cm.$^{-1}$). It was confirmed by chemical analysis that iodine value of the product was reduced from 76 to 2.0, and oxirane oxygen content was 4.1%.

PREPARATION 2

200 parts of dioxane as solvent and 70 parts of 0.2 N aqueous sulfuric acid solution were added to 100 parts of mixed alkylene oxides of 16 and 18 carbon atoms (comprising 56% of $C_{16}$ compound and 44% of $C_{18}$ compound) synthesized in the same manner as in Preparation 1. The mixture was heated to 90° C. for 10 hours under reflux to effect the reaction. Thereafter, the mixture was cooled to about 60° C. and the catalyst, i.e. sulfuric acid, was neutralized with an aqueous alkali solution and dioxane used as solvent was recovered by distillation. The remainder was washed three times with warm water (70° C.) to remove water-soluble inorganic and organic substances. The upper oily layer was cooled to obtain 110 parts of white waxy solid (M.P. 55–60° C.), IR analysis proved the existence of OH radical (3400, 1100, 1070 cm.$^{-1}$) and chemical analysis revealed a hydroxy value of 386 (theoretical value 407). It will be referred to as lubricant [B] of the present invention hereinafter. Lubricant [B] is comprised principally of (1) 94% of compounds of the general formula

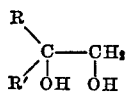

wherein either one of R and R' represents hydrogen and the other represents a straight chain, saturated alkyl radical of 14 or 16 carbon atoms and (2) 6% of compounds of the same formula wherein both R and R' represent a straight chain, saturated alkyl radical, the total carbon atoms in both radicals being 14 or 16.

PREPARATION 3

100 parts of mixed alkylene oxides of 20–30 carbon atoms obtained in Preparation 1 and 150 parts of glacial acetic acid were charged in a reactor and heated under reflux and stirring for 5 hours. After completion of the reaction, unreacted acetic acid was removed, washed with water and dried to obtain 115 parts of the product, which will be referred to as lubricant [C] of the present invention hereinafter. Lubricant [C] is comprised principally of (1) 75% of compounds of the general formula

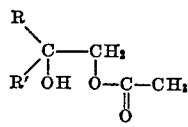

wherein either one of R and R' represents hydrogen and the other represents a straight chain, saturated alkyl radical of 18–28 carbon atoms and (2) 25% of compounds of the same general formula wherein both R and R' represent a straight chain, saturated alkyl radical, the total carbon atoms in both radicals being 18–28. IR analysis proved the existence of —OH radical (3400, 1180 cm.$^{-1}$) and ester linkage (1740, 1250, 1090 cm.$^{-1}$) and chemical analysis revealed an ester value of 139 (theoretical: 137).

PREPARATION 4

100 parts of mixed alkylene oxides of 20–30 carbon atoms obtained in Preparation 1 and 240 parts of valeric acid were charged in a reactor and reacted at 120° C. for 7 hours under stirring. After completion of the reaction, the reaction mixture was treated in the same manner as in Preparation 3 to obtain 129 parts of the product, which will be referred to as lubricant [D] of the present invention hereinafter. Lubricant [D] is comprised of (1) 75% of compounds of the general formula:

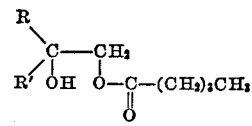

wherein either one of R and R' represents hydrogen and the other represents a straight chain, saturated alkyl radical of 18–28 carbon atoms and (2) 25% of compounds of the same general formula wherein both R and R' represent a straight chain, saturated alkyl radical, the total carbon atoms in both radicals being 18–28. The existence of —OH radical and ester linkage was confirmed in the same manner as in Preparation 3.

PREPARATION 5

100 parts of mixed alkylene oxides of 20–30 carbon atoms obtained in Preparation 1, 155 parts of ethylene glycol and 1 part of metallic sodium were charged in a reactor and reacted at 100° C. for 5 hours. After completion of the reaction, water was added to the reaction mixture to remove water-soluble inorganic and organic substances. After drying, 113 parts of the product were obtained, which will be referred to as lubricant [E] of the present invention hereinafter.

Lubricant [E] is comprised principally of (1) 75% of compounds of the general formula:

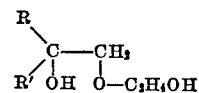

wherein either one of R and R' represents hydrogen and the other represents a straight chain, saturated alkyl radical of 18–28 carbon atoms and (2) 25% of compounds of the same general formula wherein both R and R' represent a straight chain, saturated alkyl radical, the total carbon atoms in both radicals being 18–28. —OH radical (3450 cm.$^{-1}$) and ether linkage (1125, 1070 cm.$^{-1}$) were confirmed according to IR analysis.

PREPARATION 6

100 parts of mixed alkylene oxides of 20–30 carbon atoms obtained in Preparation 1, 200 parts of n-butyl alcohol and 2 parts of metallic sodium were charged in a reactor and reacted at 120° C. for 5 hours. Thereafter, the catalyst was neutralized with sulfuric acid. Water was added to the reaction mixture to remove water-soluble, inorganic and organic substances. After drying, 108 parts of the product were obtained, which will be referred to as lubricant [F] of the present invention hereinafter. Lubricant [F] is principally comprised of (1) 75% of compounds of the general formula:

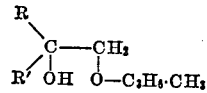

wherein either one of R and R' represents hydrogen and the other represents a straight chain, saturated alkyl radical of 18–28 carbon atoms and (2) 25% of compounds of the same general formula wherein both R and R' represent a straight chain, saturated alkyl radical, the total carbon atoms in both radicals being 18–28. The existence of —OH radical and ether linkage was confirmed in the same manner as in Preparation 5.

PREPARATION 7

100 parts of mixed alkylene oxides of 20–30 carbon atoms obtained in Preparation 1, 60 parts of allyl alcohol and 1 part of metallic sodium were charged in an autoclave which was then closed, and the reaction was effected at 190° C. for 2 hours. After completion of the reaction, the reaction mixture was washed with water, filtered and dried to obtain 75 parts of the product, which will be referred to as lubricant [G] of the present invention hereinafter.

Lubricant [G] is principally comprised of (1) 75% of compounds of the general formula:

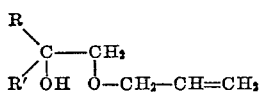

wherein either one of R and R' represents hydrogen and the other represents a straight chain, saturated alkyl radical of 18–28 carbon atoms and (2) 25% of compounds of the same general formula wherein both R and R' represent a straight chain, saturated alkyl radical, the total carbon atoms in both radicals being 18–28. The existence of —OH radical (3400, 1100 cm.$^{-1}$), ether linkage (1130 cm.$^{-1}$) and —CH=CH$_2$ (3080, 1640 cm.$^{-1}$) was confirmed according to IR analysis.

PREPARATION 8

200 parts of mixed α-olefins of 30–44 carbon atoms (average molecular weight: 540) and 100 parts of benzene were charged in a stainless steel reactor provided with a reflux condenser, stirrer, thermometer and dropping funnel and heated to 65° C. After the solution in the reactor became homogeneous, 158 parts of peracetic acid solution [comprising 46.5% of ethyl acetate, 21.5% of peracetic acid, 0.5% of water, 0.03% of an organic phosphate of the structure Na$_2$-(2-ethylhexyl)$_5$(P$_3$O$_{10}$)$_2$ and the remainder of acetic acid] were added over one hour. Thereafter, the reaction was continued at an elevated temperature of 70° C. for 4 hours. After completion of the reaction, the solvent was distilled out and acetic acid was then distilled out under reduced pressure to obtain 205.5 parts of the product, which will be referred to as lubricant [H] of the present invention hereinafter. Lubricant [H] is principally comprised of (1) 63% of compounds of the general formula:

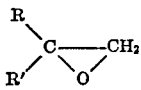

wherein either one of R and R' represents hydrogen and the other represents a straight chain, saturated alkyl radical of 28–42 carbon atoms and (2) 37% of compounds of the same general formula wherein both R and R' represent a straight chain saturated alkyl radical, the total carbon atoms in both radicals being 28–42. The existence of

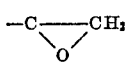

(3050, 1250, 915 and 850 cm.$^{-1}$) was confirmed according to IR analysis. It was also confirmed that the iodine value of the product was reduced from 47.1 to 2.0 and exirane oxygen content was 2.5%.

PREPARATION 9

200 parts of glacial acetic acid were added to 100 parts of mixed alkylene oxides of 30–44 carbon atoms obtained in the same manner as in Preparation 8 and the mixture was heated at 118° C. under reflux for 6 hours to effect the reaction. Thereafter, unreacted acetic acid was distilled out under reduced pressure and the mixture was washed with water and dried to obtain 106.9 parts of the product, which will be referred to as lubricant [I] of the present invention hereinafter. Lubricant [I] is principally comprised of (1) 63% of compounds of the general formula:

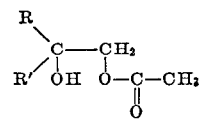

wherein either one of R and R' represents hydrogen and the other represents a straight chain, saturated alkyl radical of 28–42 carbon atoms and (2) 37% of compounds of the same general formula wherein both R and R' represent a straight chain, saturated alkyl radical, the total carbon atoms in both radicals being 28–42. The existence of —OH radical (3400, 1180 cm.$^{-1}$) and ester linkage (1740, 1250 and 1090 cm.$^{-1}$) was confirmed according to IR analysis. An ester value of 84.0 (theoretical value: 82.5) was obtained according to a chemical analysis.

PREPARATION 10

100 parts of mixed alkylene oxides of 30–44 carbon atoms obtained in the same manner as in Preparation 8, 200 parts of ethyl alcohol and 1 part of metallic sodium were charged in an autoclave which was then closed, and reaction was effected at 190° C. for 2 hours. After completion of the reaction, the reaction mixture was washed with water, filtered and dried to obtain 103.5 parts of the product, which will be referred to as lubricant [J] of the present invention hereinafter. Lubricant [J] is principally comprised (2) 63% of compounds of the general formula:

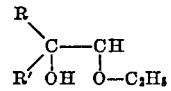

wherein either one of R and R' represents hydrogen and the other represents a straight chain, saturated alkyl radical of 28–42 carbon atoms and (2) 37% of compounds of the same general formula wherein both R and R' represent a straight chain, saturated alkyl radical, the total carbon atoms in both radicals being 28–42.

The existence of —OH radical (3400, 1100 cm.$^{-1}$) and ether linkage (1130 cm.$^{-1}$) were confirmed according to IR analysis.

The following examples show examples of the lubricants of the present invention when incorporated into plastics.

EXAMPLE 1

100 parts of vinyl chloride resin (Zeon 103–EP) and 2 parts of a stabilizer (dibutyltin maleate) were mixed thoroughly with 1 part of a lubricant of the present invention obtained in Preparations 1–7. The mixture was blended with mixing rolls at 170° C. for 5 minutes. Separately, the same composition but containing no lubricant and the same composition but containing stearic acid as a conventionally used lubricant were prepared for comparison.

In the evaluation, lubricity and plate-out were determined during roll-blending and the resulting sheets were examined for early coloring and further heat resistance durability in a Geer type oven tester at 190° C. Separately, the roll-treated sheets were pressed at 170° C. under 100 kg./cm.$^{-2}$ for 7 minutes and the transparencies thereof were evaluated. The results are shown in Table 1.

TABLE 1

| Number | Composition PVC | Stabilizer | Lubricant Kind | Lubricant Amount | Lubricity | Plate-out | Early coloring | Transparency | Remarks |
|---|---|---|---|---|---|---|---|---|---|
| 1 | 100 parts | 2 parts | Lubricant A [1] | 1 part | ◎ | ○ | ◎ | ◎ | Preparation 1. |
| 2 | do | do | Lubricant B [1] | do | ◎ | ○ | ◎ | ◎ | Preparation 2. |
| 3 | do | do | Lubricant C [1] | do | ◎ | ○ | ◎ | ◎ | Preparation 3. |
| 4 | do | do | Lubricant D [1] | do | ◎ | ○ | ◎ | ◎ | Preparation 4. |
| 5 | do | do | Lubricant E [1] | do | ◎ | ○ | ◎ | ◎ | Preparation 5. |
| 6 | do | do | Lubricant F [1] | do | ◎ | ○ | ◎ | ◎ | Preparation 6. |
| 7 | do | do | Lubricant G [1] | do | ◎ | ○ | ◎ | ◎ | Preparation 7. |
| 8 | do | do | Stearic acid | do | ◎ | × | ○ | ◎ | Comparison. |
| 9 | do | do | | | ○ | × | ○ | ◎ | Control. |

[1] Of the present invention.

The above results are average values of the evaluations of 5 workers based on the following evaluation standards:

Lubricity: ◎ excellent, ○ good, △ tolerable, × improper.
Plate-out: ○ none, △ slight, × recognized.
Early coloring: ◎ none, ○ slight, △ yellow, × brown.
Transparency: ◎ excellent, ○ good, △ tolerable, × improper.

The results of the heat resistance test in a Geer type oven tester are shown in Table 2.

TABLE 2

| Lubricant | Discoloration 10 mins. | 20 mins. | 30 mins. | 40 mins. | 50 mins. | 60 mins. |
|---|---|---|---|---|---|---|
| Lubricant A of the present invention | | | Slight yellow | | Slight yellow | Yellow. |
| Lubricant C of the present invention | | | Yellowish | | Yellowish | Yellowsh yellow. |
| Commercially available lubricant (stearic acid) | Slight yellow | do | | Yellow | | Brown. |
| Blank (No lubricant) | Yellowish | Yellow | Brown | | | |

As shown in Table 2, the lubricants of the present invention have excellent heat resistance durability due to synergism with stabilizers. The heat resistance tests of lubricants [B], [D], [E], [F] and [G] of the present invention were effected in the same manner as above to reveal the effects equivalent to those of [A] and [C] of the present invention.

EXAMPLE 2

100 parts of vinyl chloride resin (Zeon 103–EP–8, $\bar{P}$:800), stabilizers of 3 parts of N–2000–E (a product of Nitto Kasei Co.), 1 part of 5–LP (a product of Nitto Kasei Co.) and 1 part of dioctyl phthalate and 0.5 part of a lubricant [H], [I] or [J] obtained in Preparations 8–10 of the present invention were mixed thoroughly and then blended with mixing rolls at 170° C. for 5 minutes. For comparison, the same composition but containing no lubricant and the same composition but containing stearic acid as a conventionally used lubricant were prepared. In the evaluation, lubricity and plate-out were determined during roll-blending and the resulting sheets were examined for early coloring and further heat resistance durability in a Geer type oven tester at 190° C. Separately, the roll-treated sheets were pressed at 170° C. under 100 kg./cm.² for 7 minutes and the transparencies thereof were evaluated. The results are shown in Table 3, which are average values of 5 workers on the same Evaluation Standards as in Table 1:

TABLE 3

| Lubricant | Lubricity | Plate-out | Early coloring | Transparency |
|---|---|---|---|---|
| Lubricant H [1] | ◎ | ○ | ◎ | ◎ |
| Lubricant I [1] | ◎ | ○ | ◎ | ◎ |
| Lubricant J [1] | ◎ | ○ | ◎ | ◎ |
| Blank (no lubricant) | △ | × | ○ | ◎ |
| Stearic acid | ○ | × | ○ | ◎ |

[1] Of the present invention.

The results of the heat resistance test in a gear oven are shown in Table 4.

TABLE 4

| Lubricant | Discoloration 20 mins. | 40 mins. | 60 mins. | 80 mins. | 100 mins. |
|---|---|---|---|---|---|
| Lubricant H [1] | | | | Slight yellow. | Yellowish green. |
| Lubricant I [1] | | | | do | Do. |
| Lubricant J [1] | | | | do | Do. |
| Commercially available stearic acid. | | | Slight yellow. | Yellow | Dark brown. |
| Blank | | | do | Slight yellow. | Green. |

[1] Of the present invention.

EXAMPLE 3

Blending properties of the same vinyl chloride resin compositions containing the same stabilizers and the lubricant H of the present invention as in Example 2 except that the amount of the lubricant H is varied to 0.5, 1.0 and 1.5 parts were evaluated by using a Brabender plastograph (PL–750, a product of Brabender Co. of U.S.A.). The results are shown in Table 5.

TABLE 5

| Amount of lubricant (parts) | Maximum blending torque (m.-kg.) | | | |
|---|---|---|---|---|
| | 0 | 0.5 | 1.0 | 1.5 |
| Kinds of lubricant: | | | | |
| Stearic acid | 6.2 | 6.1 | 6.0 | 5.9 |
| Lubricant H of the invention | 6.2 | 5.8 | 5.3 | 5.0 |

It is apparent that, in the presence of a lubricant of the present invention, the lubricity is increased and the maximum blending torque is remarkably decreased.

The embodiments of the invention in which an exclusive property or privilege is claimed are defined as follows:

1. A plastic composition having improved fluidity and workability consisting essentially of polyvinyl chloride resin having blended therein from 0.1 to 3.0% by weight, based on the weight of said polyvinyl chloride resin, of one or a mixture of lubricants of the formula (1) and (2):

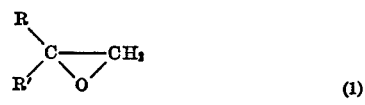

(1)

and

(2)

wherein R and R' each represent hydrogen or a straight chain, saturated alkyl radical, and the sum of the carbon atoms in both R and R' being 14 to 42, and A and B represent hydrogen,

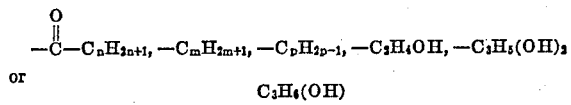

or C₃H₅(OH)

in which n, m and p represent an integer of 1 to 9, 1 to 10 and 2 to 10, respectively.

2. A plastic composition as claimed in Claim 1, wherein the amount of the lubricant is from 0.1 to 1.5% by weight based on the weight of the polyvinyl chloride resin.

3. A plastic composition according to Claim 1, in which the sum of the carbon atoms in both R and R' is from 16 to 30 and the amount of said lubricant is from 0.3 to 1.5% by weight, based on the weight of the polyvinyl chloride resin.

4. A plastic composition according to Claim 1, in which the sum of the carbon atoms in both R and R' is from 31 to 42 and the amount of said lubricant is from 0.1 to 0.5% by weight, based on the weight of the polyvinyl chloride resin.

References Cited
UNITED STATES PATENTS

| | | | |
|---|---|---|---|
| 2,860,117 | 11/1958 | Pritchard | 260—45.8 A |
| 3,457,318 | 7/1969 | Haas | 260—45.8 A |
| 3,183,211 | 5/1965 | Brinker | 260—45.8 A |
| 2,769,798 | 11/1956 | Meis | 260—45.8 A |
| 3,399,155 | 8/1968 | Baer | 260—890 |

ALLAN LIEBERMAN, Primary Examiner

P. R. MICHL, Assistant Examiner

U.S. Cl. X.R.

260—31.4 R, 31.6, 33.2 R, 33.4 R, 45.8 A